US008387188B2

(12) United States Patent
Murphy

(10) Patent No.: US 8,387,188 B2

(45) Date of Patent: Mar. 5, 2013

(54) MULTI-PURPOSE TOOL

(76) Inventor: Kyles K. Murphy, Verdal (NO)

( * ) Notice: Subject to any disclaimer, the term of this patent is extended or adjusted under 35 U.S.C. 154(b) by 258 days.

(21) Appl. No.: 12/873,425

(22) Filed: Sep. 1, 2010

(65) Prior Publication Data

US 2012/0047659 A1 Mar. 1, 2012

(51) Int. Cl.
*A01B 1/20* (2006.01)
*A01D 11/06* (2006.01)
*B25D 1/00* (2006.01)

(52) U.S. Cl. ................................................ 7/116; 7/147

(58) Field of Classification Search ...... 7/116, 144–147, 7/169; 294/49, 50.5; D8/10
See application file for complete search history.

(56) References Cited

U.S. PATENT DOCUMENTS

| | | | | | |
|---|---|---|---|---|---|
| 856,575 | A | * | 6/1907 | Elliott | 294/49 |
| 1,229,667 | A | * | 6/1917 | Stimecz | 7/116 |
| 1,326,108 | A | | 12/1919 | Seelye | |
| 1,561,993 | A | * | 11/1925 | Nielsen | 7/118 |
| 1,690,944 | A | * | 11/1928 | Peterson | 172/13 |
| 1,882,288 | A | * | 10/1932 | Lee | 7/116 |
| 2,696,294 | A | * | 12/1954 | Tarnay | 206/372 |
| 3,074,752 | A | * | 1/1963 | Kirkel | 294/53.5 |
| 3,473,712 | A | * | 10/1969 | Genchi | 224/234 |
| 3,824,641 | A | * | 7/1974 | Shandel | 7/116 |
| 3,837,023 | A | | 9/1974 | Spencer-Foote | |
| 4,287,623 | A | | 9/1981 | Tarran | |
| 4,700,420 | A | * | 10/1987 | Belanger | 7/114 |
| D293,412 | S | * | 12/1987 | Gonzales | D8/10 |
| 4,727,609 | A | * | 3/1988 | Smith, Jr. | 7/145 |
| 5,103,520 | A | * | 4/1992 | Mazzo | 7/104 |
| 5,141,353 | A | | 8/1992 | Meredith et al. | |
| 5,398,360 | A | * | 3/1995 | Alexander | 7/158 |
| 5,507,051 | A | * | 4/1996 | Mazon | 7/116 |
| D442,445 | S | * | 5/2001 | Morgan | D8/10 |
| 6,357,067 | B1 | * | 3/2002 | Jones | 7/116 |
| 6,378,153 | B1 | * | 4/2002 | Morgan | 7/116 |
| 6,560,805 | B2 | * | 5/2003 | Dallas et al. | 7/116 |
| D495,568 | S | * | 9/2004 | Register | D8/10 |
| 7,036,952 | B2 | | 5/2006 | Zirk et al. | |
| D525,093 | S | * | 7/2006 | Noonan et al. | D8/10 |
| 7,219,382 | B2 | * | 5/2007 | Johnson | 7/116 |
| D577,980 | S | | 10/2008 | Mihaelson | |
| 2008/0055889 | A1 | | 3/2008 | Anderson et al. | |

* cited by examiner

*Primary Examiner* — David B Thomas

(74) *Attorney, Agent, or Firm* — Duane Morris LLP; Pablo Meles

(57) ABSTRACT

A multipurpose tool (10) can comprise a shovel (14) on a top center area, a hatchet or ax (18) on a lower area adjacent to the shovel, a hammer (16) on an opposing side of the hatchet or ax on the lower area, and a handle (24) protruding from the lower area; The shovel, hatchet or ax, and hammer are integrated as a single piece. The handle can also be integrated with the shovel, ax or hatchet, and hammer as a single or unitary piece. An accessory handle or tool 20 can selectively attach to the multipurpose tool 10. Additional embodiments are disclosed.

18 Claims, 2 Drawing Sheets

10

10

MULTI-PURPOSE TOOL

FIELD

This invention relates generally to multipurpose tools, and more particularly to a multi-purpose tool having a shovel, hammer, and hatchet or ax.

BACKGROUND

There are a large number of tools for campers, hikers, military personnel and others who want a relatively compact and lightweight multifunctional tool for use under circumstances where there is not access to all of the different tools needed to perform various tasks. In general, the tool should be lightweight yet have high structural strength to withstand rugged use. Furthermore, the tool should require little or no assembly.

The snow shovel is a fundamental piece of equipment for the winter mountaineer, and every member of a winter party should carry one. The shovel is used to excavate climbers from avalanche debris, dig emergency shelters, prepare tent platforms, and clear climbing routes. In choosing a shovel, a climber is torn between the heavy, bulky grain scoop, ideal for moving large amounts of loose snow quickly but less useful for avalanche debris or snow caves, and the compact folding or sectional shovel, convenient to carry and therefore less likely to be left at home. A snow shovel has also become an essential tool for backcountry travel. It is used for excavating an avalanche victim, building a snow shelter, and digging a snow pit.

Of course, the need for the reduction of weight in survival tools has been addressed by others as has the need to integrate one or another tool with the basic ax. However, there is a small problem in that the means for attachment are complicated and the location of where the shovel resides is awkward. In an environment where a shovel is needed, any simplification of attachment can be viewed as an improvement.

SUMMARY

A first embodiment of the present disclosure can entail a multipurpose tool can comprise a shovel on a top center area, a hatchet or ax on a lower area adjacent to the shovel, a hammer on an opposing side of the hatchet or ax on the lower area, and a handle protruding from the lower area; The shovel, hatchet or ax, and hammer are integrated as a single piece.

A second embodiment of the present disclosure can entail a multipurpose tool comprising a shovel shaped member on a top center area, a hatchet or ax on a first side and a hammer on an opposing second side. The shovel is centrally disposed above the hatchet or ax and the hammer. The multipurpose tool can further include a handle protruding between and below the hatchet or ax and hammer.

In yet another embodiment, a multipurpose tool can comprise a shovel on a top center area, a hatchet or ax on a lower area adjacent to the shovel, a hammer on an opposing side of the hatchet or ax on the lower area, and a primary handle protruding from the lower area. The multipurpose tool can further include an attachment handle with accessory tools selectively coupled to the primary handle where the accessory tools comprise one of a knife, a chisel, file or a saw.

DETAILED DESCRIPTION OF THE DRAWINGS

Figure 1:
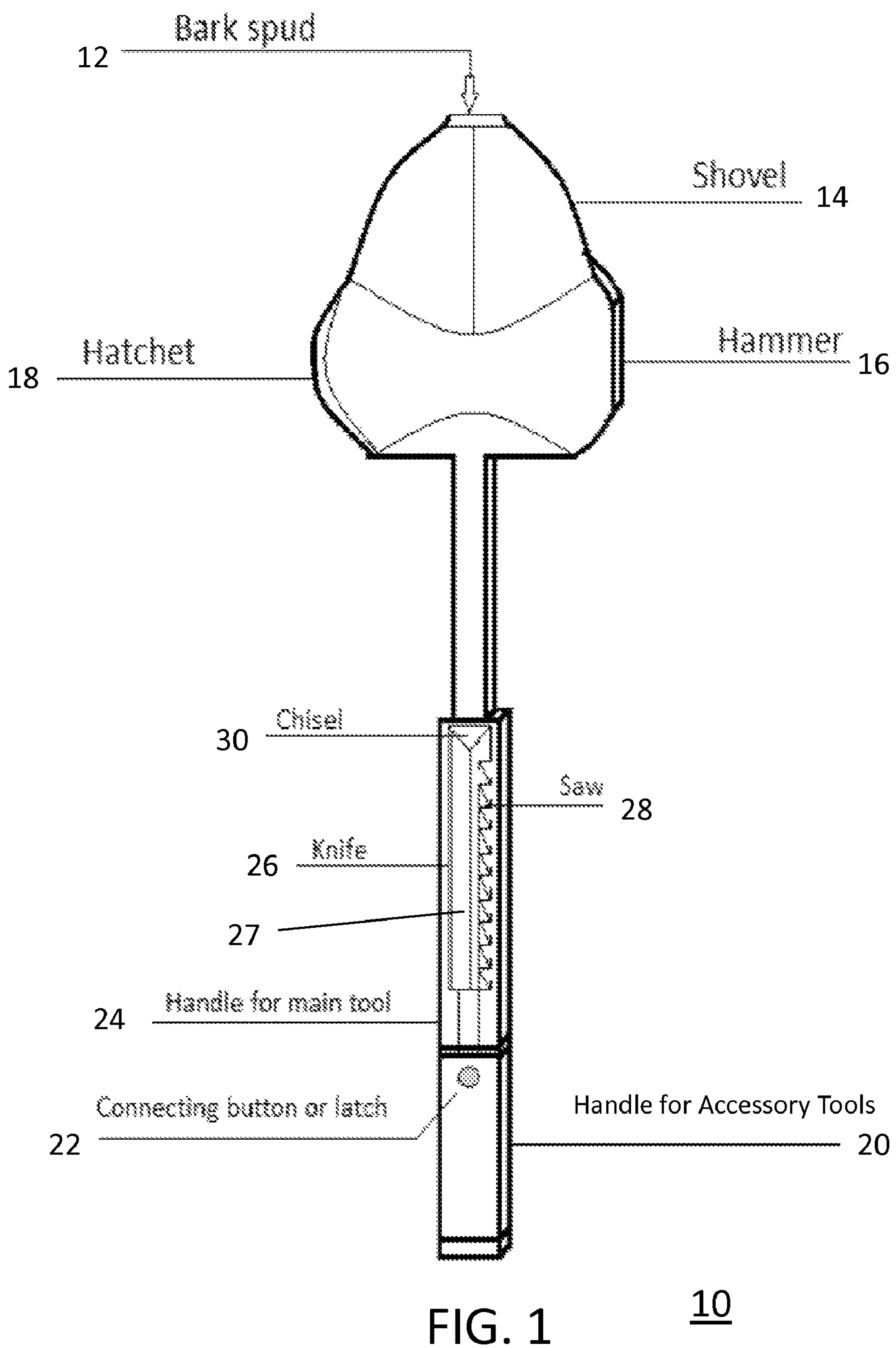
FIG. 1 front perspective view of the multi-purpose tool in a first configuration in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein provide a multipurpose tool that is useful for camping, military, hiking or rescue purposes or any other number of purposes in a lightweight, simple and compact form factor. The main or primary tool can include a shovel, hammer, and ax or hatchet with an elongated handle integrated in a single or unitary piece. The primary tool can be made from any number of materials such as cast iron, aluminum, carbon fiber, or even titanium. An accessory tool can be selectively attachable to the primary tool using a latch or other attachment mechanism. The accessory tool can include for example a chisel, knife or saw or any combination thereof. If the handle of the main tool is hollow, then the accessory tool can reside within the hollow handle when attached to the primary tool. Alternatively, the accessory tools (chisel, knife or saw) can reside substantially flush against the handle when the accessory tool is attached to the primary tool.

Referring to FIG. 1, a multipurpose tool 10 can include a shovel or shovel member 14 on a top center area and a hatchet or ax 18 on a lower area adjacent to the shovel. A hammer 16 can reside on an opposing side of the hatchet or ax on the lower area. In other words, a hatchet or ax resides on a first side and a hammer resides on an opposing second side such that the shovel is centrally disposed above the hatchet or ax and the hammer. The tool 10 can also include a bark spud 12 on a top edge surface of the shovel 14. A handle 24 for the main tool (or primary handle 24) protrudes from the lower area or protrudes between and below the hatchet or ax and the hammer. The shovel 14, hatchet or ax 18, and hammer 16 can be integrated as a single or unitary piece. Such construction can avoid assembly and reduce costs. Although not necessary, the main tool (having the shovel, hammer and ax or hatchet) can be made from a unitary material such as metal, plastic, or carbon fiber among other materials. Ideally, the material is lightweight, yet rugged enough to serve the purposes of such plurality of tools.

The multipurpose tool 10 can further include an attachment handle 20 that includes accessory tools. The accessory tools for example can include a knife 26, a file (or knurled surface) 27, a chisel 30 or saw 28 or any combination thereof. Other tools can be included in the accessory tools and the included accessory tools can be arranged in different configurations. The attachment handle 20 can attach to the primary handle 24 at the bottom of the primary handle 24. For example, the attachment handle 20 can latch to the primary handle 24 protruding from the lower area using a latch 22 or some other form of secure attachment mechanism.

Figure 2:
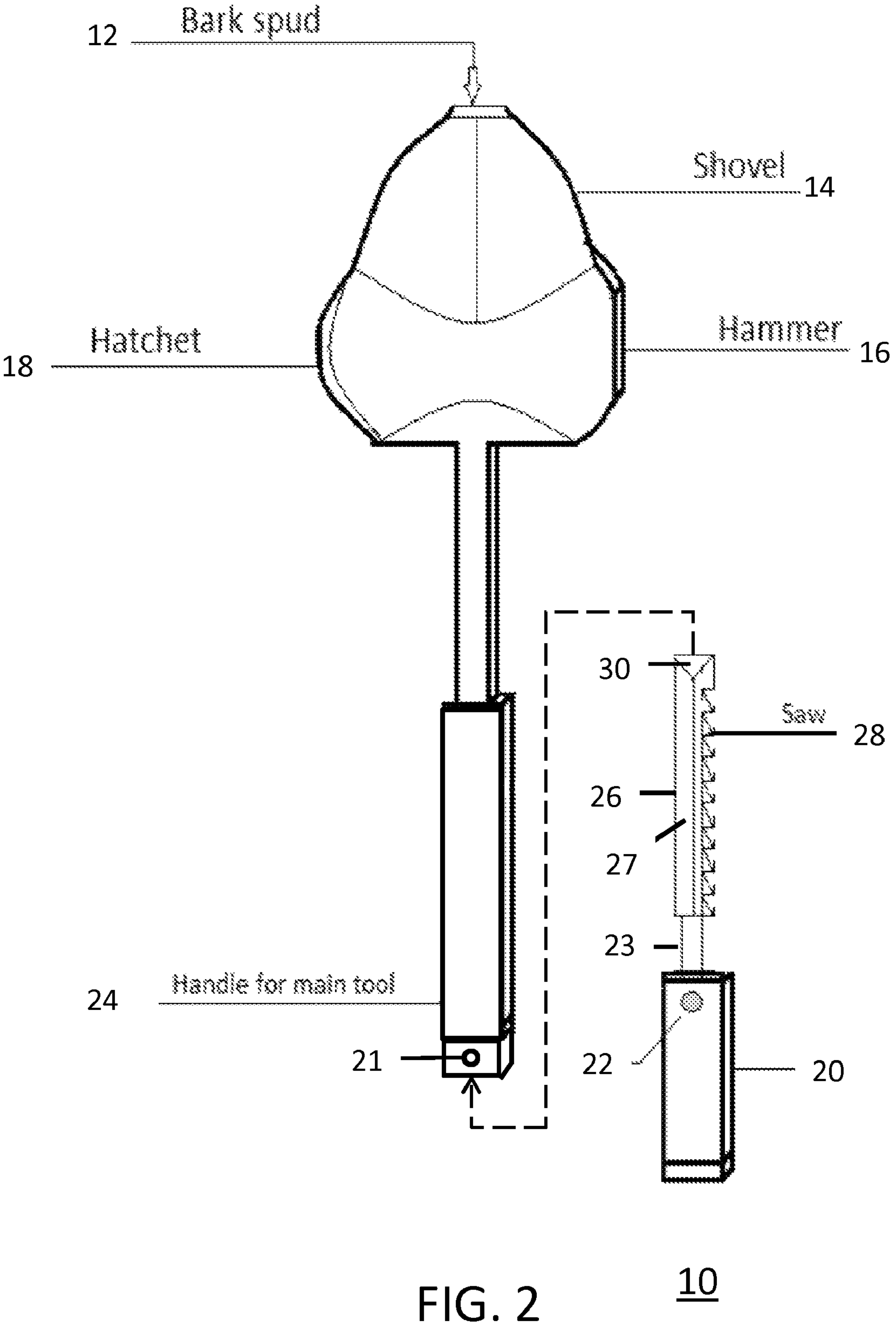
FIG. 2 is a front perspective view of the multipurpose tool in a second configuration showing accessory tools disengaged from the primary tool in accordance with an embodiment of the present invention.

Referring to FIG. 2, a detailed view of the multipurpose tool 10 is shown with the accessory tool detached or disengaged from the main tool. The attachment mechanism can take many forms, but can include a displaceable detent or bump 21 on the primary handle 24 that mates with the latch portion 22 on the accessory handle 20. The bump 21 can be spring biased or at least displaceable with the force of a user's fingers to enable the accessory handle 20 to disengage from the primary handle 24. To attach the accessory handle 20 back with the main tool, the user can merely slip the accessory handle over the area with the bump 21 until the two members mate securely. One or more bumps can be used to provide a secure attachment.

In light of the foregoing description, it should be recognized that embodiments in accordance with the present invention can be realized with different materials, manufacture, or methods of production. In light of the foregoing description, it should also be recognized that the multipurpose tool in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A multipurpose tool, comprising:

a primary tool comprising:

a shovel on a top center area;

a hatchet or ax on a lower area adjacent to the shovel;

a hammer on an opposing side of the hatchet or ax on the lower area; and a handle protruding from the lower area, wherein the handle comprises a hollow area enabling the storage of at least an accessory tool within the hollow area of the primary tool;

wherein the shovel, hatchet or ax, hammer, and handle are integrated as a single piece made from a unitary material.

2. The multipurpose tool of claim 1, wherein the multipurpose tool further comprises an attachment handle with accessory tools.

3. The multipurpose tool of claim 2, wherein the multipurpose tool further comprises an attachment handle with accessory tools including a knife, chisel, file or saw.

4. The multipurpose tool of claim 2, wherein the multipurpose tool further comprises an attachment handle with accessory tools including a knife, chisel and saw.

5. The multipurpose tool of claim 1, wherein the multipurpose tool further comprises an attachment handle that latches to the handle protruding from the lower area of the primary tool.

6. The multipurpose tool of claim 1, wherein the multipurpose tool further comprises a bark spud on the top edge surface of the shovel.

7. The multipurpose tool of claim 1, wherein the multipurpose tool is made from a unitary material selected from metal, plastic, or carbon fiber.

8. A multi-purpose tool comprising:

a primary tool comprising:

a shovel shaped member on a top center area;

a hatchet or ax on a first side and a hammer on an opposing second side, wherein the shovel is centrally disposed above the hatchet or ax and the hammer; and a handle protruding between and below the hatchet or ax and hammer, wherein the handle comprises a hollow area enabling the storage of at least an accessory tool within the hollow area of the primary tool and wherein the shovel shaped member, the hatchet or ax, hammer, and handle are integrated as a single piece made from a unitary material.

9. The multipurpose tool of claim 8, wherein the shovel, hatchet or ax, hammer and handle are integrated and made from the unitary material composed of carbon fiber.

10. The multipurpose tool of claim 8, wherein the multipurpose tool is made from a unitary material selected from metal, plastic, or carbon fiber.

11. The multipurpose tool of claim 8, wherein the multipurpose tool further comprises an attachment handle with accessory tools.

12. The multipurpose tool of claim 11, wherein the multipurpose tool further comprises an attachment handle with accessory tools including a knife, chisel, file, or saw.

13. The multipurpose tool of claim 11, wherein the multipurpose tool further comprises an attachment handle with accessory tools including a knife, chisel and saw.

14. The multipurpose tool of claim 8, wherein the multipurpose tool further comprises an attachment handle that latches to the handle centrally protruding below the area between the hatchet or ax and the hammer.

15. The multipurpose tool of claim 8, wherein the multipurpose tool further comprises a bark spud on the top edge surface of the shovel.

16. A multipurpose tool, comprising:

a primary tool, comprising:

a shovel on a top center area;

a hatchet or ax on a lower area adjacent to the shovel;

a hammer on an opposing side of the hatchet or ax on the lower area; and a primary handle protruding from the lower area, wherein the shovel, hatchet or ax, hammer, and primary handle are integrated as a single piece made from a unitary material; and an attachment handle with accessory tools selectively coupled to the primary handle, wherein the accessory tools comprises one of a knife, a chisel, or a saw.

17. The multipurpose tool of claim 16, wherein the accessory tools comprise a knife, chisel and saw and wherein the primary handle comprises a hollow area enabling storage of the accessory tools within the hollow area of the primary handle when the attachment handle is attached to the primary handle.

18. The multipurpose tool of claim 16, wherein the attachment handle selectively couples to the primary handle using a latch mechanism.

* * * * *